(12) United States Patent
Matsubara (10) Patent No.: US 8,203,650 B2
(45) Date of Patent: Jun. 19, 2012

(54) PULL-DOWN SIGNAL DETECTING APPARATUS, PULL-DOWN SIGNAL DETECTING METHOD, AND VIDEO-SIGNAL CONVERTING APPARATUS

(75) Inventor: Shogo Matsubara, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1266 days.

(21) Appl. No.: 11/980,453

(22) Filed: Oct. 31, 2007

(65) Prior Publication Data

US 2008/0100745 A1    May 1, 2008

(30) Foreign Application Priority Data

Oct. 31, 2006  (JP) .................................. 2006-297153

(51) Int. Cl.
*H04N 7/01* (2006.01)
(52) U.S. Cl. ......................................... 348/458; 348/459
(58) Field of Classification Search .................. 348/458, 348/459
See application file for complete search history.

(56) References Cited

U.S. PATENT DOCUMENTS

| | | | |
|---|---|---|---|
| 5,563,651 A | | 10/1996 | Christopher et al. |
| 5,691,771 A | * | 11/1997 | Oishi et al. ........................ 348/97 |
| 6,236,806 B1 | | 5/2001 | Kojima et al. |
| 6,891,571 B2 | | 5/2005 | Shin et al. |
| 2004/0264740 A1 | | 12/2004 | Song |
| 2005/0254792 A1 | * | 11/2005 | Kimoto .......................... 386/111 |
| 2006/0104356 A1 | | 5/2006 | Crinon |
| 2006/0119702 A1 | | 6/2006 | Lin |
| 2007/0188662 A1 | * | 8/2007 | Winger et al. ................. 348/701 |

FOREIGN PATENT DOCUMENTS

| | | |
|---|---|---|
| JP | 10-257485 | 9/1998 |
| JP | 3102494 | 8/2000 |
| JP | 2002-290927 | 10/2002 |
| JP | 2003-348546 | 12/2003 |
| JP | 2005-94094 A | 4/2005 |
| JP | 2006-020119 | 1/2006 |
| JP | 2006-507747 | 3/2006 |
| JP | 2006-094094 | 4/2006 |

OTHER PUBLICATIONS

Japanese Office Action dated Sep. 6, 2011.

* cited by examiner

*Primary Examiner* — Joseph P Hirl
*Assistant Examiner* — Hyun Hong
(74) *Attorney, Agent, or Firm* — Pillsbury Winthrop Shaw Pittman, LLP (57) ABSTRACT

An inter-field pull-down pattern detecting circuit determines whether an input video signal is a first pull-down signal or a second pull-down signal, on the basis of input plug information and a pattern of the consecutive inter-field correlation levels, obtained from an inter-field correlation determination circuit. A counter counts the number of times the pattern detecting circuit determines that the input video signal is the first pull-down signal. The counter is reset to "0" when the input video signal is determined to be other than the first and second pull-down signals. When the count of the counter exceeds a preset value, the input video signal is finally determined to be the first pull-down signal.

7 Claims, 11 Drawing Sheets

PULL-DOWN SIGNAL DETECTING APPARATUS, PULL-DOWN SIGNAL DETECTING METHOD, AND VIDEO-SIGNAL CONVERTING APPARATUS

CROSS-REFERENCE TO RELATED APPLICATIONS

This application is based upon and claims the benefit of priority from Japanese Patent Application No. 2006-297153, filed Oct. 31, 2006, the entire contents of which are incorporated herein by reference.

BACKGROUND

1. Field

The present invention relates to an apparatus that converts an interlace-scan video signal to a progressive-scan video signal. More particularly, the invention relates to an apparatus that detects an interlace-scan video signal such as a movie video signal generated in the 2-3 pull-down format or the 2-2 pull-down format.

2. Description of the Related Art

The NTSC video signal generally used as a TV broadcast wave has been generated by performing interlace scanning on an image. The number of equivalent images formed per second is thereby increased, thus reducing a flicker. In recent years, thin TV receivers having a liquid crystal display or a plasma display have come into use in increasing numbers. If an interlace-scan video signal is used in such a display to display the image along the scanning lines, the luminance of the image will decrease so much that the viewer hesitates to see it. Therefore, such a display performs progressive scanning to display images. In order to display an image represented by an interlace signal on a progressive-scan display, an interlace-scan/progressive-scan converting circuit must be used.

The video signals of the standard TV system such as the NTSC system include a video signal generated on the basis of a movie-film image in some cases. A movie-film image is composed of 24 frames per second. On the other hand, a video signal of the standard TV system is an interlace signal representing 30 frames per second (i.e., 60 fields per second). Therefore, the movie-film image is converted to an image of the 2-3 pull-down format or 2-2 pull-down format, obtaining a video signal for the standard TV system. Any interlace-scan video signal obtained by converting a movie-film image to such an image will be hereinafter referred to as pull-down signal.

In the 2-3 pull-down system, for example, a movie film is scanned, generating a progressive-scan video signal having a frame frequency of 24 Hz. Then, the frames of the movie film are converted to fields of a video signal. More specifically, the first frame is converted to the first and second fields (two fields), the second frame to the third to fifth fields (three fields), the third frame to sixth and seventh fields (two fields), the fourth frame to the eighth to tenth fields (three fields), and so forth. Thus, in the 2-3 pull-down system the same image field is repeatedly used, twice or three times. The field signals converted to pull-down signals is reproduced in a format defined by odd-numbered fields and even-numbered fields arranged alternately.

Thus, two frames in the movie film correspond to five fields in a video signal of the standard TV system. In the video signal, two-field parts and three-field parts are alternately arranged, corresponding to the frames of the movie film, respectively.

In order to convert such a pull-down signal to a progressive signal, every two fields generated from the same frame of the movie film must be synthesized into one frame. A video-signal converting apparatus for accomplishing this first determines whether the input video signal is a pull-down signal or not, then determines which fields should be synthesized into a frame if the input signal is a pull-down signal, and finally syntheses the fields, thereby generating a progressive signal. This signal processing is called pull-down interpolation.

To perform pull-down interpolation, it must be first determined whether the input signal is a pull-down signal. Jpn. Pat. Appln. KOKAI Publication No. 2006-20119 and Jpn. Pat. Appln. KOKAI Publication No. 2005-94094 apparatuses for detecting pull-down signals. The apparatus disclosed in Jpn. Pat. Appln. KOKAI Publication No. 2006-20119 detects pull-down signals by utilizing an inter-field dynamic/static determination pattern and an inter-frame dynamic/static determination pattern. The apparatus disclosed in Jpn. Pat. Appln. KOKAI Publication No. 2005-94094 can discriminate detect pull-down signal even if the pull-down signals are distorted and differs in period.

The conventional apparatus that detect or discriminate pull-down signals is designed on the assumption that the frames constituting a progressive image (24 frames per second), from which a pull-down signal has been generated, are different from one another. In some cases, however, the 2-3 pull-down signal or 2-2 pull-down signal has been generated from a progressive image that is a video signal from which some frames have been extracted and in which the same frame is used twice. Such a video signal is used in animated-cartoon videos.

If a pull-down signal, from which some frames have been extracted, is input, the inter-frame dynamic/static determination pattern will not match with the ordinary pull-down signal pattern. Inevitably, it will take a long time to discriminate the pull-down signal.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a pull-down signal detecting apparatus comprises: a difference-calculating circuit which finds a difference between the present field signal of an input video signal and a signal delayed by one field with respect to the present field signal; an inter-field correlation determination circuit which compares the difference output from the difference-calculating circuit, with a first comparison value, adds the result of the comparison for each field, compares the result of the addition with a second comparison value and determines an inter-field correlation level; a first determination circuit which determines whether the input video signal is one of a first pull-down signal and a second pull-down signal for each field period, on the basis of first flag information input and a pattern of consecutive inter-field correlation levels obtained by the inter-field correlation determination circuit and; a first flag unit which sets a flag when the first determination circuit determines that the input video signal is the first pull-down signal, and which supplies data representing the state of the flag, as the first flag information, to the first determination circuit; a second determination circuit comprising a first counter configured to count the number of times the first determination circuit determines that the input video signal is the first pull-down signal, and which determines that the input video signal is the first pull-down signal, when the count of the first counter exceeds a first preset value; and a resetting unit which resets the count of the first counter to "0" when the first determination circuit determines that the input video signal is a signal other than the first and second pull-down signals.

The pull-down signal detecting apparatus can detect, with high precision, a pull-down signal generated by extracting some frames from a progressive image and by using the same frame image, for example, twice continuously. Thus, the apparatus can perform an appropriate pull-down process on pull-down signals.

Figure 1:
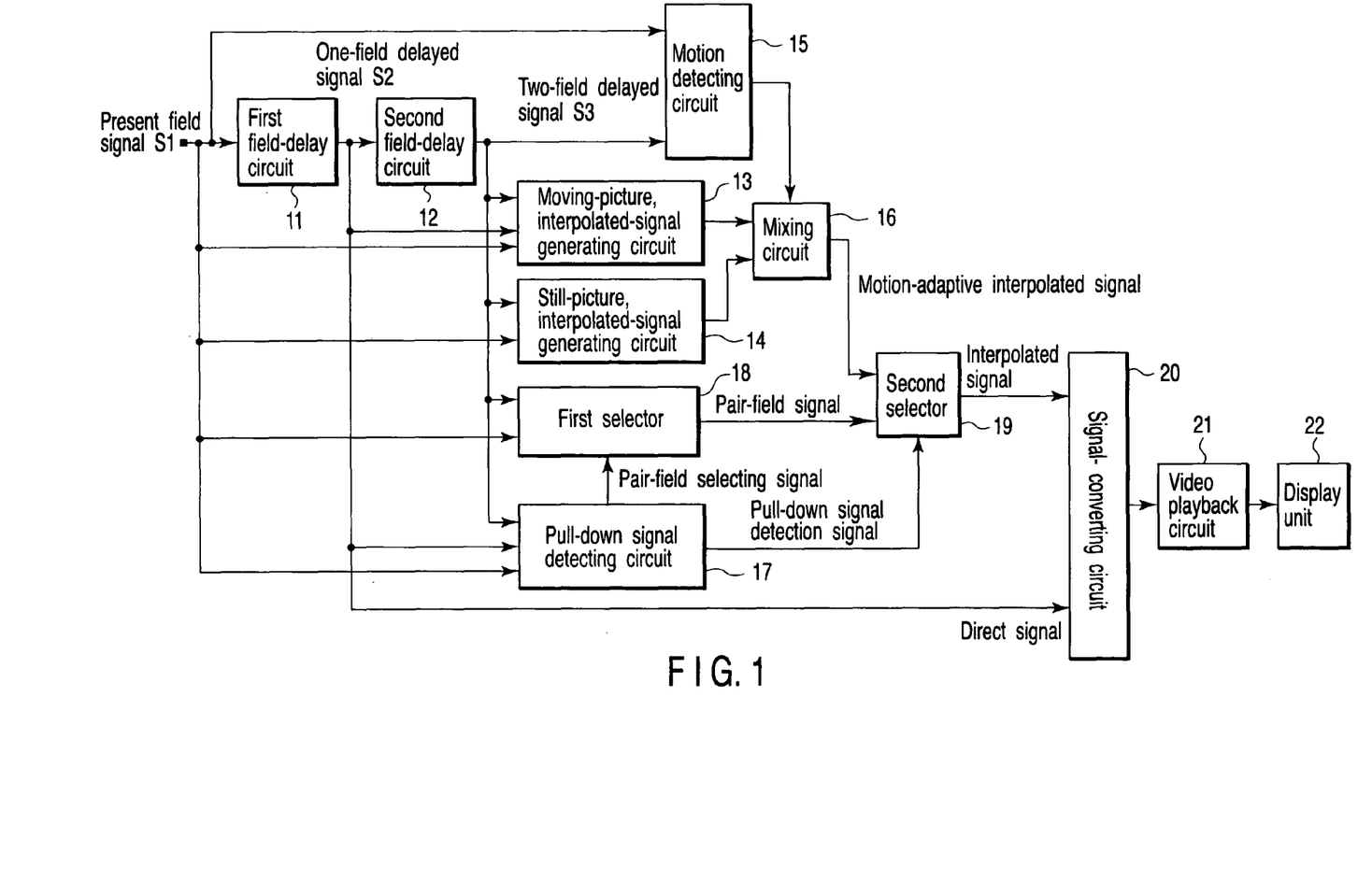
FIG. 1 is a block diagram showing the configuration of an embodiment of a video-signal converting apparatus that incorporates a pull-down signal detecting circuit according to the present invention.

FIG. 1 is a block diagram showing the configuration of an embodiment of a video-signal converting apparatus that incorporates a pull-down signal detecting circuit according to this invention.

A present field signal S1, which is an interlace-scan video signal input to the video-signal converting apparatus, is input to a first field-delaying circuit 11. The first field-delaying circuit 11 outputs the signal upon lapse of a one-field time, as a one-field-delayed signal S2. The first field-delaying circuit 11 has, for example, two one-field memory areas. Thus, one-field video signals input are alternately recorded in the two memory areas. The video signals recorded are alternately read from the two memory areas. Therefore, the next present field signal is recorded as field signal S1 in the first field-delaying circuit 11, while the present field signal recorded is being read as one-field-delayed signal S2 from the first field-delaying circuit 11. The one-field-delayed signal S2 is input a second field-delaying circuit 12. The second field-delaying circuit 12 outputs the signal upon lapse of the one-field time, as a two-field-delayed signal S3. The second field-delaying circuit 12 is identical in configuration to the first field-delaying circuit 11.

A moving-picture, interpolated-signal generating circuit 13 performs motion interpolation by using, for example, a motion vector, on the present field signal S1, one-field-delayed signal S2 and two-field-delayed signal S3, thereby generating a moving-picture interpolated signal that exists between the scanning lines for the one-field-delayed signal S2. A still-picture, interpolated-signal generating circuit 14 generates a still-picture interpolated signal existing between the scanning lines for the one-field-delayed signal S2, from the present field signal S1 and the two-field-delayed signal S3. More precisely, the circuit 14 uses the average of, for example, the present field signal S1 and the two-field-delayed signal S3 or the value of two-field-delayed signal S3, to generate the still-picture, interpolated signal.

A motion detecting circuit 15 detects an inter-frame motion from the present field signal S1 and the two-field-delayed signal S3, generating a motion-detection signal, which is output to a mixing circuit 16. The mixing circuit 16 changes the mixing ratio on the basis of the motion-detection signal. The circuit 16 mixes the moving-picture interpolated signal with the still-picture interpolated signal, generating a motion-adaptive interpolated signal using the mixing ration.

The pull-down signal detecting circuit 17 according to this invention determines whether the one-field-delayed signal S2 is a pull-down signal, from the present field signal S1, one-field-delayed signal S2 and two-field-delayed signal S3. If the one-field-delayed signal S2 is a pull-down signal, the circuit 17 generates a pull-down detection signal and a pair-field selecting signal. The pull-down signal detecting circuit 17 will be described later in detail.

In accordance with the pair-field selecting signal, a first selector 18 selects the present field signal S1 or the two-field-delayed signal S3, as a field to be paired with the one-field-delayed signal S2. The signal selected is output as a pair-field signal to a second selector 19. The second selector 19 selects the pair-field signal if the pull-down detection signal indicates a pull-down signal. Otherwise, the second selector 19 selects the motion-adaptive interpolated signal. The signal thus selected is output as an interpolated signal. A signal-converting circuit 20 aligns (or synthesizes) the interpolated signal with the one-field-delayed signal, i.e., direct signal, in the order these signals scanned, thereby generating a progressive signal.

A video playback circuit 21 performs analog-to-digital (A/D) conversion and amplification on the progressive signal, generating a video playback signal. A display unit 22 displays the image represented by the video playback signal.

Figure 2:
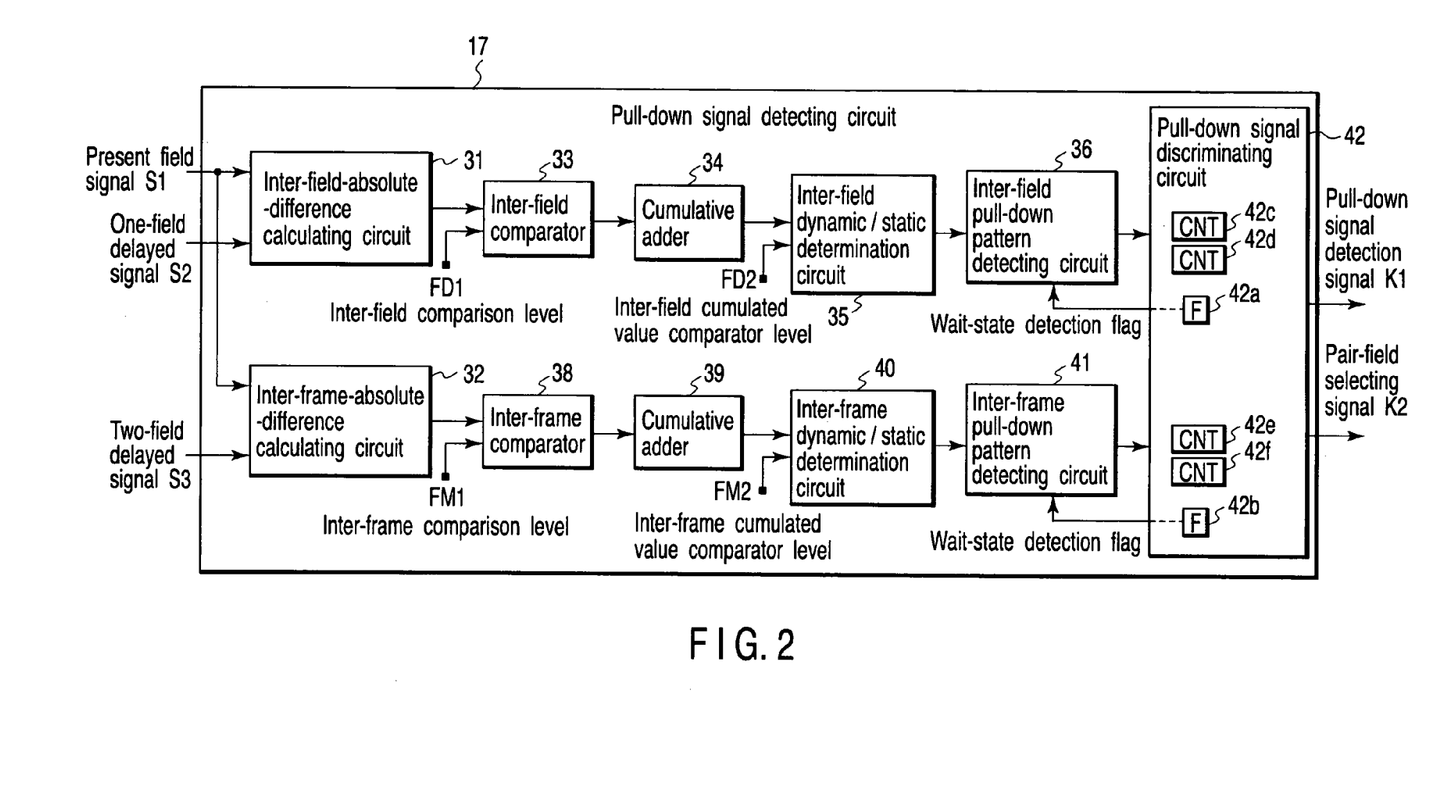
FIG. 2 is a block diagram showing the configuration of an embodiment of the pull-down signal detecting circuit according to this invention.

FIG. 2 is a block diagram showing the configuration of an embodiment of the pull-down signal detecting circuit 17 according to this invention.

In the pull-down signal detecting circuit 17, the present field signal S1 is input to an inter-field-difference (absolute value) calculating circuit 31 and an inter-frame-difference (absolute value) calculating circuit 32. The one-field-delayed signal S2 is input to the inter-field-difference calculating circuit 31. The two-field-delayed signal S3 is input to the inter-frame-difference calculating circuit 32.

The inter-field-difference calculating circuit 31 calculates, in units of pixels, the absolute value of the difference between the present field signal S1 and the one-field-delayed signal S2. The output of the inter-field-difference calculating circuit 31 is used to determine the field correlation between the present field signal S1 and the one-field-delayed signal S2. On the other hand, the inter-frame-difference calculating circuit 32 calculates, in units of pixels, the absolute value of the difference between the present field signal S1 and the two-field-delayed signal S3. The output of the inter-frame-difference calculating circuit 32 is used to determine the correlation between the present field signal S1 and the two-field-delayed signal S3.

The output signal of the inter-field-difference calculating circuit 31 is input to an inter-field comparator 33 and is compared with an inter-field comparison level FD1. The result of the comparison is cumulated by a cumulative adder 34, during each field period. The cumulated result is input to an inter-field dynamic/static determination circuit 35. The inter-field dynamic/static determination circuit 35 compares an inter-field cumulative value comparison level FD2 with the cumulated result output from the cumulative adder 34. If the inter-field correlation is intensive, the circuit 35 determines that the inter-field correlation is static. If the inter-field correlation is weak, the circuit 35 determines that the inter-field correlation is dynamic.

Meanwhile, the output signal of the frame-field-difference calculating circuit 32 is input to an inter-frame comparator 38 and is compared with an inter-frame comparison level FM1. The result of the comparison is cumulated by a cumulative adder 39, during each frame period. The cumulated result is input to an inter-frame dynamic/static determination circuit 40. The inter-frame dynamic/static determination circuit 40 compares an inter-frame cumulative value comparison level FM2 with the cumulated result output from the cumulative adder 39. If the inter-frame correlation is intensive, the circuit 40 determines that the inter-frame correlation is static. If the inter-frame correlation is weak, the circuit 40 determines that the inter-frame correlation is dynamic.

An inter-field pull-down pattern detecting circuit 36 determines whether the result of the inter-field dynamic/static determination for a plurality of consecutive fields, for example, five consecutive fields, is identical to a pattern specific to a 2-3 pull-down signal or a 2-2 pull-down signal. An inter-frame pull-down pattern detecting circuit 41 determines whether the result of the inter-frame dynamic/static determination for a plurality of consecutive fields, for example, five consecutive fields, is identical to a pattern specific to a 2-3 pull-down signal or a 2-2 pull-down signal.

A pull-down signal discriminating circuit 42 determines whether an input signal is a pull-down signal, such as a 2-3 pull-down signal or a 2-2 pull-down signal, in accordance with whether the result of inter-field pull-down pattern detection and the result of inter-frame pull-down pattern detection satisfy the pull-down signal condition for a period of a pre-determined number of fields. The result of determination, which indicates whether the input signal is a pull-down signal or not, is output as pull-down signal detection signal K1. If the input signal is a pull-down signal, the pull-down signal discriminating circuit 42 outputs a pair-field selecting signal K2 that indicates whether the field to be paired with the one-field-delayed signal S2 is the present field signal S1 or the two-field-delayed signal S3.

Figures 3A, 3B:
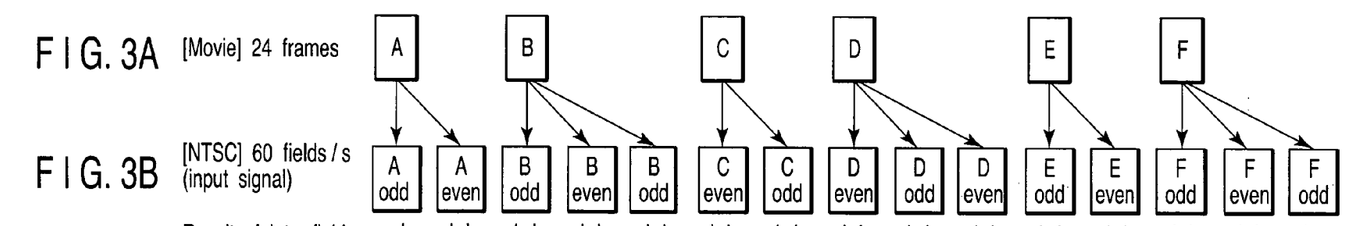
FIGS. 3A to 3D are diagrams showing the inter-field dynamic/static determination pattern and inter-frame dynamic/static determination pattern of the 2-3 pull-down signal.

FIGS. 3A to 3D are diagrams showing the inter-field dynamic/static determination pattern and inter-frame dynamic/static determination pattern of a 2-3 pull-down signal. The 2-3 pull-down signal shown in FIG. 3B is generated as an NTSC interlace top-field image and an NTSC interlace bottom-field image, from the even-numbered lines and odd-numbered lines in a progressive image composed of 24 frames per second and shown in FIG. 3A. The 2-3 pull down signal is an interlace image composed of 60 frames per second. The progressive image (24 frames/sec) shown in FIG. 3A is converted to the interlace image (60 frames/sec) shown in FIG. 3B. As shown in FIG. 3B, two identical field images and three identical field images alternately recur in the interlace image. In the interlace image thus generated, a five-field periodicity is observed in terms of inter-field correlation and inter-frame correlation. A dynamic/static pattern specific to 2-3 pull-down signals is detected. In an inter-field dynamic/static pattern shown in FIG. 3C, "static" and "dynamic" alternately recur in the order mentioned. In an inter-frame dynamic/static pattern shown in FIG. 3D, "dynamic" and "static" alternately recur in the order mentioned.

Figure 4A:
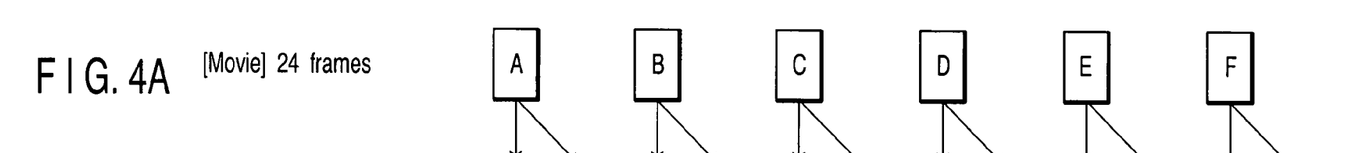
FIGS. 4A to 4D are diagrams showing the inter-field dynamic/static determination pattern and inter-frame dynamic/static determination pattern of the 2-2 pull-down signal.
Figure 4B:
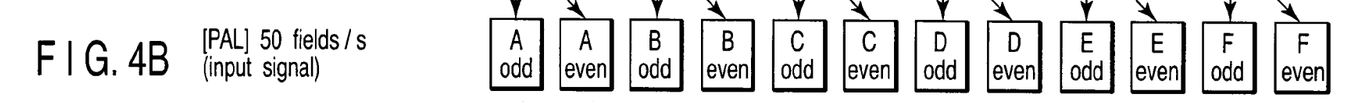

FIGS. 4A to 4D are diagrams showing the inter-field dynamic/static determination pattern and inter-frame dynamic/static determination pattern of a 2-2 pull-down signal. The 2-2 pull-down signal shown in FIG. 4B is generated as a PAL interlace top-field image and a PAL interlace bottom-field image, from the odd-numbered lines and even-numbered lines in a progressive image composed of 24 frames per second and shown in FIG. 4A. The 2-2 pull down signal is an interlace image composed of 60 frames per second. The progressive image (24 frames/sec) shown in FIG. 4A is converted to the interlace image (50 frames/sec) shown in FIG. 4B. As shown in FIG. 4B, two identical field images recur in the interlace image. In the interlace image thus generated, a periodicity is observed in terms of inter-field correlation and inter-frame correlation. A dynamic/static pattern specific to 2-2 pull-down signals is detected. In an inter-field dynamic/static pattern shown in FIG. 4C, "static" and "dynamic" alternately recur in the order mentioned. In an inter-frame dynamic/static pattern shown in FIG. 4D, only "dynamic" recurs.

The pull-down signal described above is based on the assumption that the frames constituting a progressive image (24 frames per second), from which a pull-down signal has been generated, are different from one another. In some cases, however, the 2-3 pull-down signal or 2-2 pull-down signal has been generated from a progressive image that is a video signal from which some frames have been extracted and in which the same frame is used twice continuously. Such a video signal may be inserted in an ordinary pull-down signal, for several consecutive frames over a period of, for example, several seconds. Such a video signal is used in animated-cartoon videos.

Hitherto, such an input signal cannot be discriminated as a pull-down signal. Consequently, any input pull-down signal cannot be appropriately processed. The image displaced by using the pull-down signal is low in quality.

FIGS. 5A to 5D are diagrams showing the case where a progressive image in which every two consecutive frame are identical (A,A; C,C; E,E in FIG. 5A) is converted to a 2-3 pull-down signal (FIG. 5B) and inter-field dynamic/static determination and inter-frame dynamic/static determination are performed. The result of the inter-field determination is a recurrence pattern of, for example, "static, static, static, dynamic, static," indicated in a box in FIG. 5C. The result of the inter-frame determination is a recurrence pattern of, for example, "static, static, static, dynamic, dynamic," indicated in a box in FIG. 5D. Thus, two specific dynamic/static patterns having a five-field periodicity and a five-frame periodicity, respectively, are observed in the result of dynamic/static determination. Here, these specific patterns shall be called wait-state determination patterns. If the wait-state determination patterns are detected, it is possible to detect any pull-down signal generated from a progressive image from which some frames have been extracted.

Figure 5A:
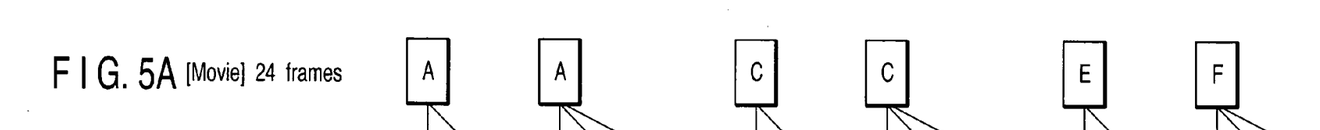
FIGS. 5A to 5D are diagrams showing an example of the wait-state determination pattern contained in the result of the inter-field dynamic/static determination pattern and inter-frame dynamic/static determination.
Figure 5B:
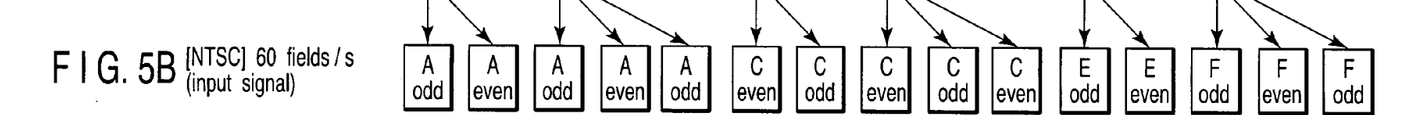

The progressive image shown in FIG. 5A is composed of frames A, A, C, C, E and F. Instead, the progressive image may be composed of A, B, B, D, D and F, or A, B, C, C, E and F. In alternative cases, too, the dynamic/static determination results in similar wait-state patterns.

As described above, the present embodiment detects pull-down signals generated from progressive images, each composed of two consecutive identical frame images. Nonetheless, the embodiment can detect any pull-down signal generated from a progressive image composed of three or more consecutive identical frame images. Preparing many wait-state determination patterns, the embodiment can detect pull-down signals, no matter how many frames (i.e., consecutive identical frames) have been extracted from the progressive signal (24 frames/sec).

Figures 6A, 6B:
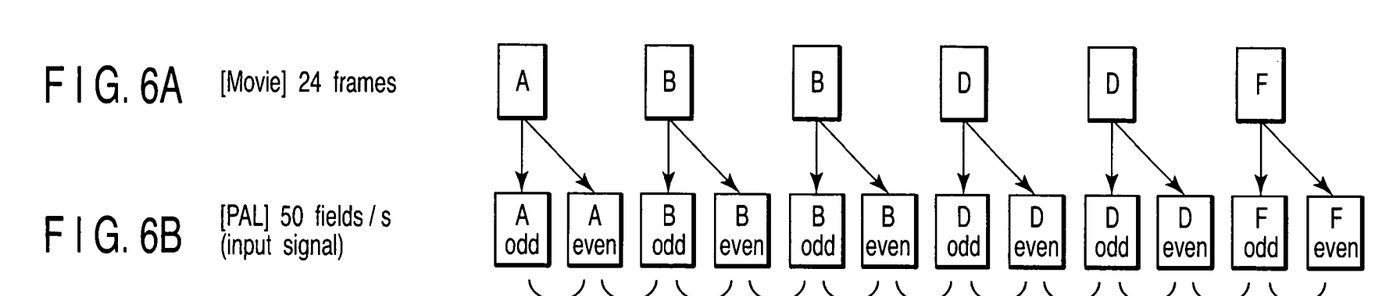
FIGS. 6A to 6D are diagrams showing another example of the wait-state determination pattern contained in the result of the inter-field dynamic/static determination pattern and inter-frame dynamic/static determination.
Figure 6C:
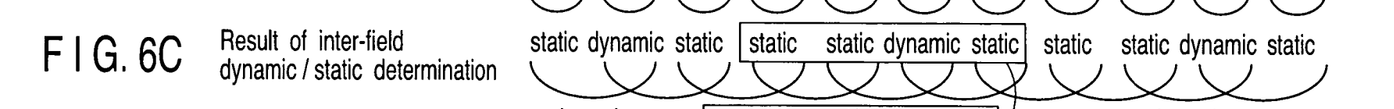
Figure 6D:
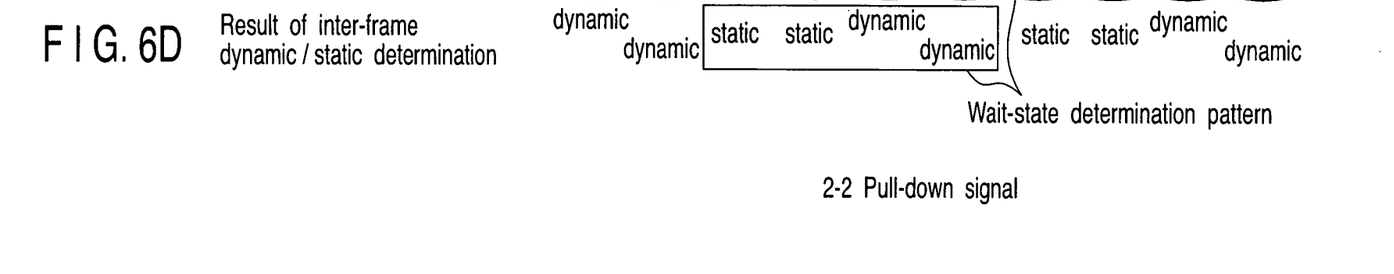

FIGS. 6A to 6D show another example of the wait-state determination pattern contained in the result of the inter-field dynamic/static determination and inter-frame dynamic/static determination. As shown in FIG. 6A, the frame images constituting the progressive image include two consecutive identical frames. Therefore, the embodiment can detect a wait-state determination pattern composed of four determination values indicated in a box. In the result of the inter-field dynamic/static determination, the pattern is "static, static, dynamic, static" as shown in FIG. 6C. In the result of the inter-frame dynamic/static determination, the pattern is "static, static, dynamic, dynamic" as shown in FIG. 6D.

Figure 5C:
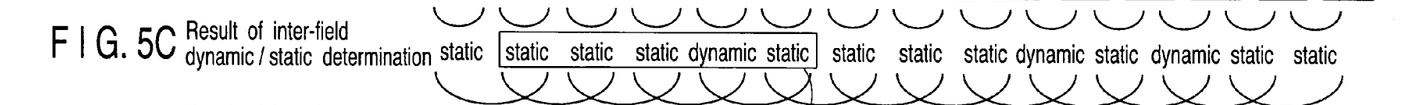
Figure 5D:
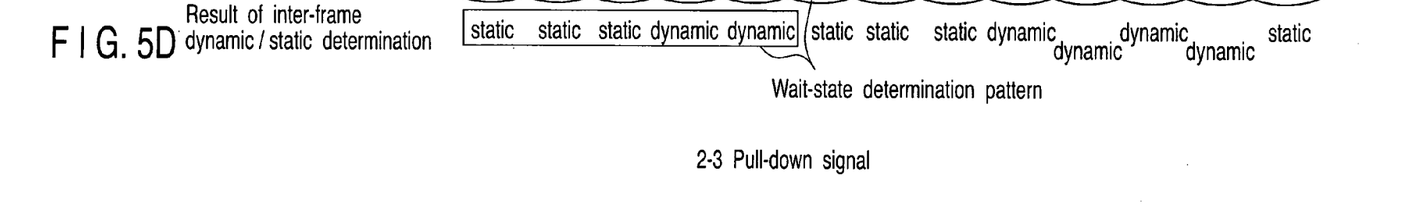
Figure 7A:
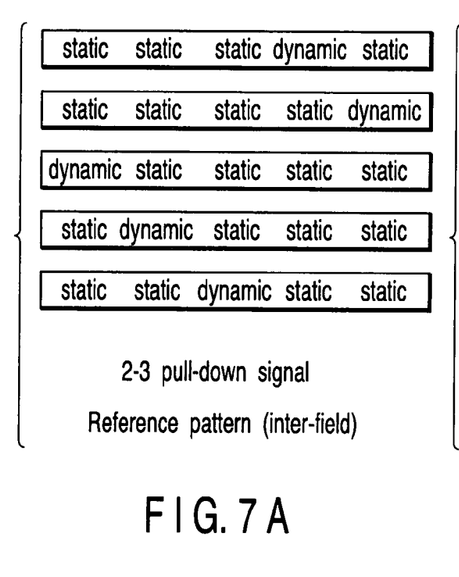
FIGS. 7A and 7B are diagrams showing two reference patterns, respectively, which are used to detect the wait-state determination pattern contained in a 2-3 pull-down signal.
Figure 7B:
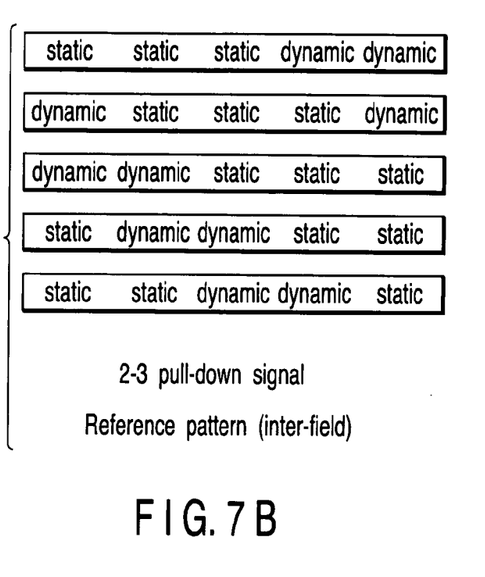
Figure 8A:
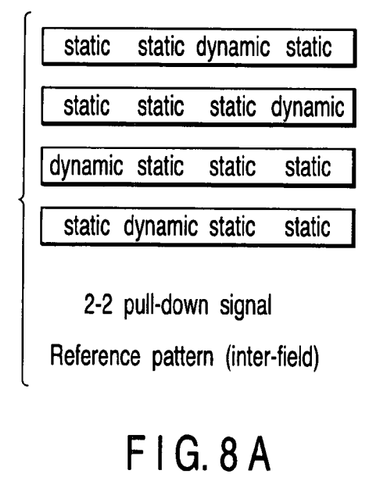
FIGS. 8A and 8B are diagrams showing two reference patterns, respectively, which are used to detect the wait-state determination pattern contained in a 2-2 pull-down signal.
Figure 8B:
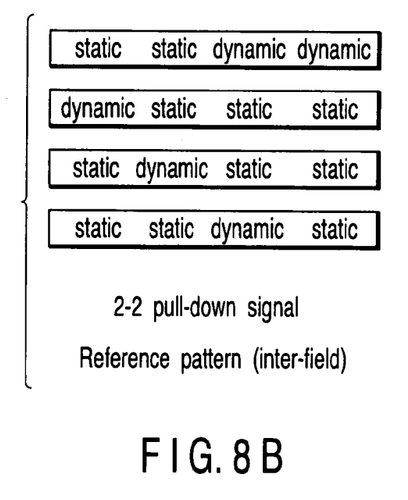

FIGS. 7A and 7B are diagrams showing two reference patterns, respectively, which the inter-field pull-down pattern detecting circuit 36 refers to, in order to detect a wait-state determination pattern from the inter-field dynamic/static determination as shown in FIGS. 5C and 6C. FIGS. 8A and 8B are diagrams showing two reference patterns, respectively, which the inter-frame pull-down pattern detecting circuit 41 refers to, in order to detect a wait-state determination pattern from the inter-frame dynamic/static determination as shown in FIGS. 5D and 6D. The reference patterns shown in FIGS. 7A, 7B, 8A and 8B are stored in the inter-frame pull-down pattern detecting circuit 41.

For example, each of the reference patterns shown in FIG. 7A is a "static, static, static, dynamic, static" determination pattern. Each reference pattern is shifted with respect to the next one by one data item. The pattern detecting circuit 36 stores the result of the dynamic/static determination performed on consecutive fields into, for example, a FIFO memory. The result of the inter-field dynamic/static determination is shifted to, for example, the right during each field period, and a new result of determination is stored at the head (left end) of the FIFO memory. During each field period, the pattern detecting circuit 36 uses the reference patterns shown in FIGS. 7A and 8B, determining whether the result stored in the FIFO memory is identical to the wait-state determination pattern. Similarly, the inter-frame pull-down pattern detecting circuit 41 refers to the reference patterns shown in FIGS. 7B and 8B, detecting the wait-state determination pattern from the result of the inter-frame dynamic/static determination.

The wait-state pattern explained with reference to FIGS. 5A to 5D or 6A to 6D will very probably appear between ordinary pull-down patterns (for example, for a period of several frames in the ordinary pull-down pattern that last for several seconds). In the circuit 17 shown in FIG. 2, the pattern detecting circuit 36, for example, does not immediately output a pull-down pattern non-detection signal when it does not detect a pull-down pattern after it detected an ordinary pull-down pattern. Rather, the circuit 36 detects a wait-state pattern and keeps outputting a pull-down pattern detection signal as long as the wait-state pattern is detected.

The pull-down signal discriminating circuit 42 keeps outputting the pull-down detection signal if the wait-state pattern lasts longer than a preset time and if an ordinary pull-down pattern is detected after the wait-state pattern.

Figure 9:
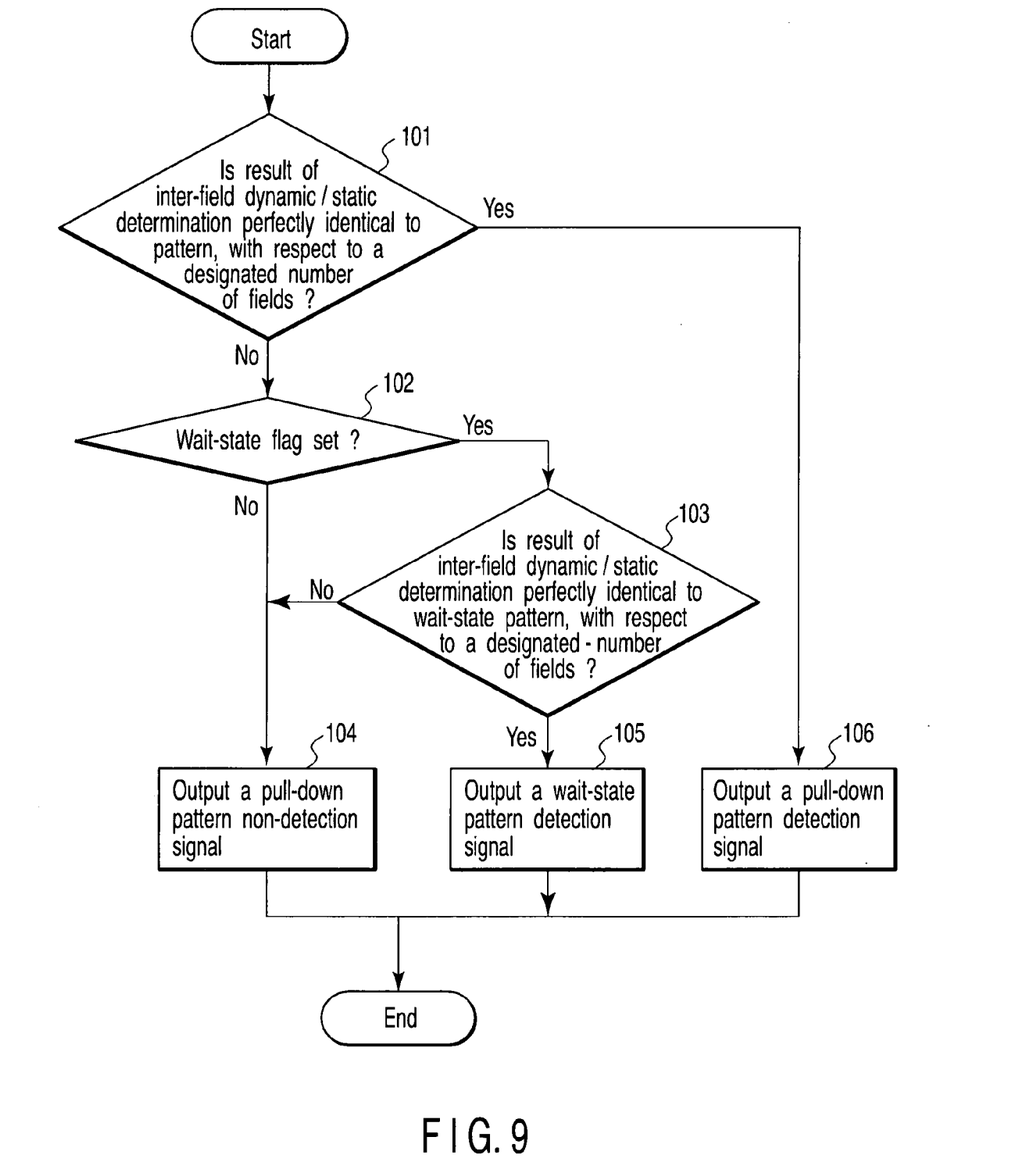
FIG. 9 is a flowchart explaining the operation of an inter-field pull-down pattern detecting circuit 36.
Figure 10:
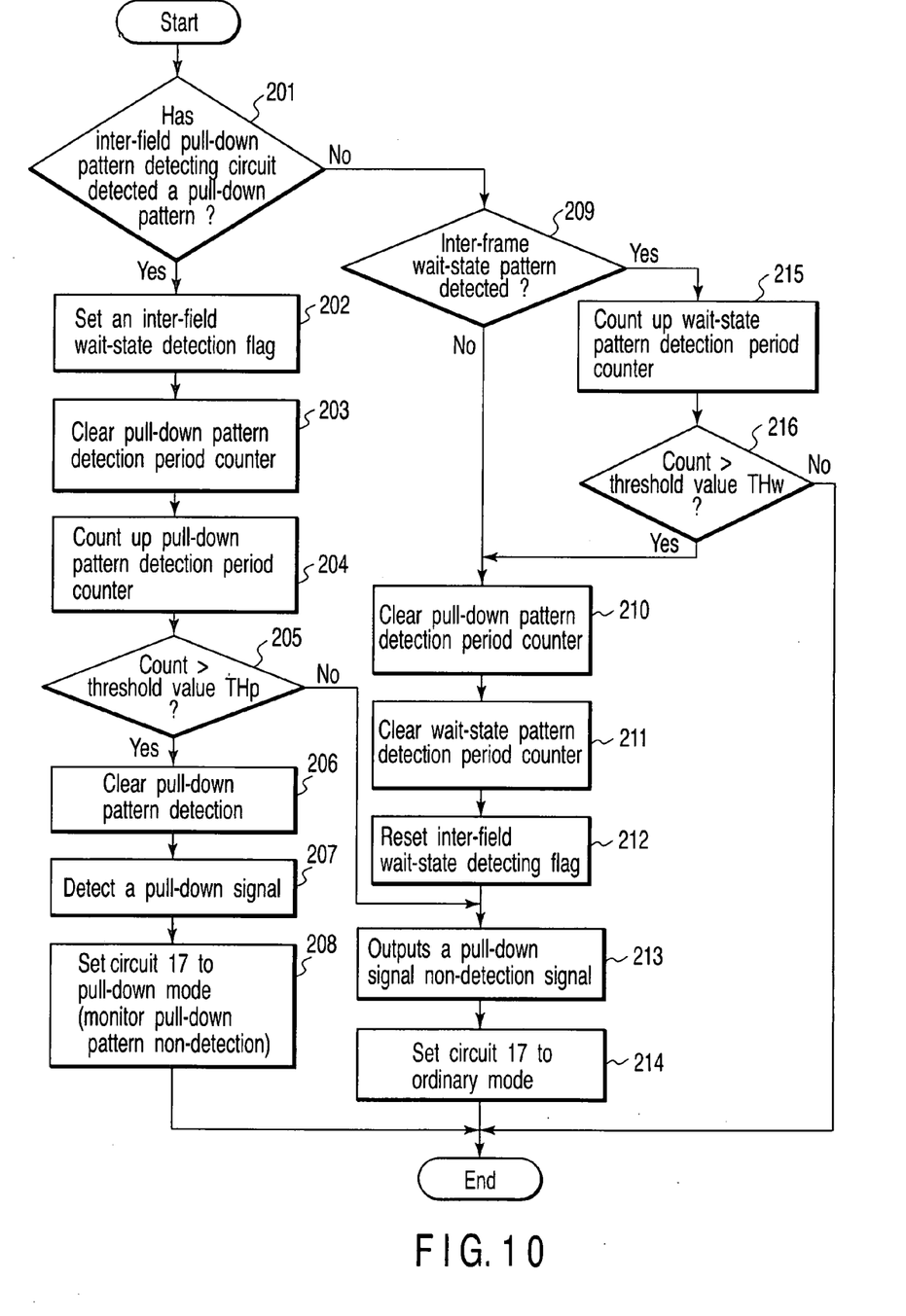
FIG. 10 is a flowchart explaining how a pull-down signal discriminating circuit 42 discriminates a pull-down signal by utilizing the output of the inter-field pull-down pattern detecting circuit 36.
Figure 11:
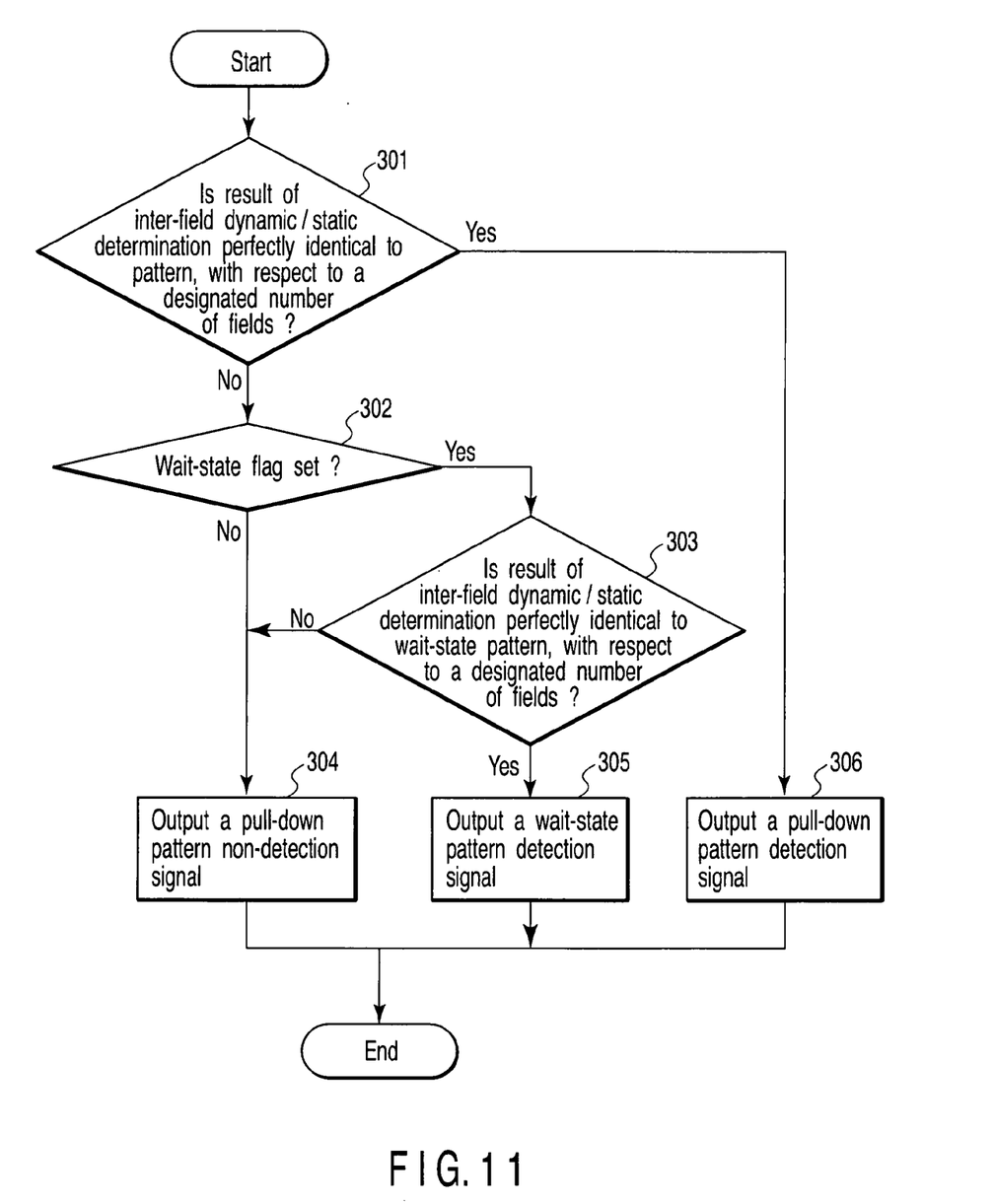
FIG. 11 is a flowchart explaining the operation of an inter-frame pull-down pattern detecting circuit 41.
Figure 12:
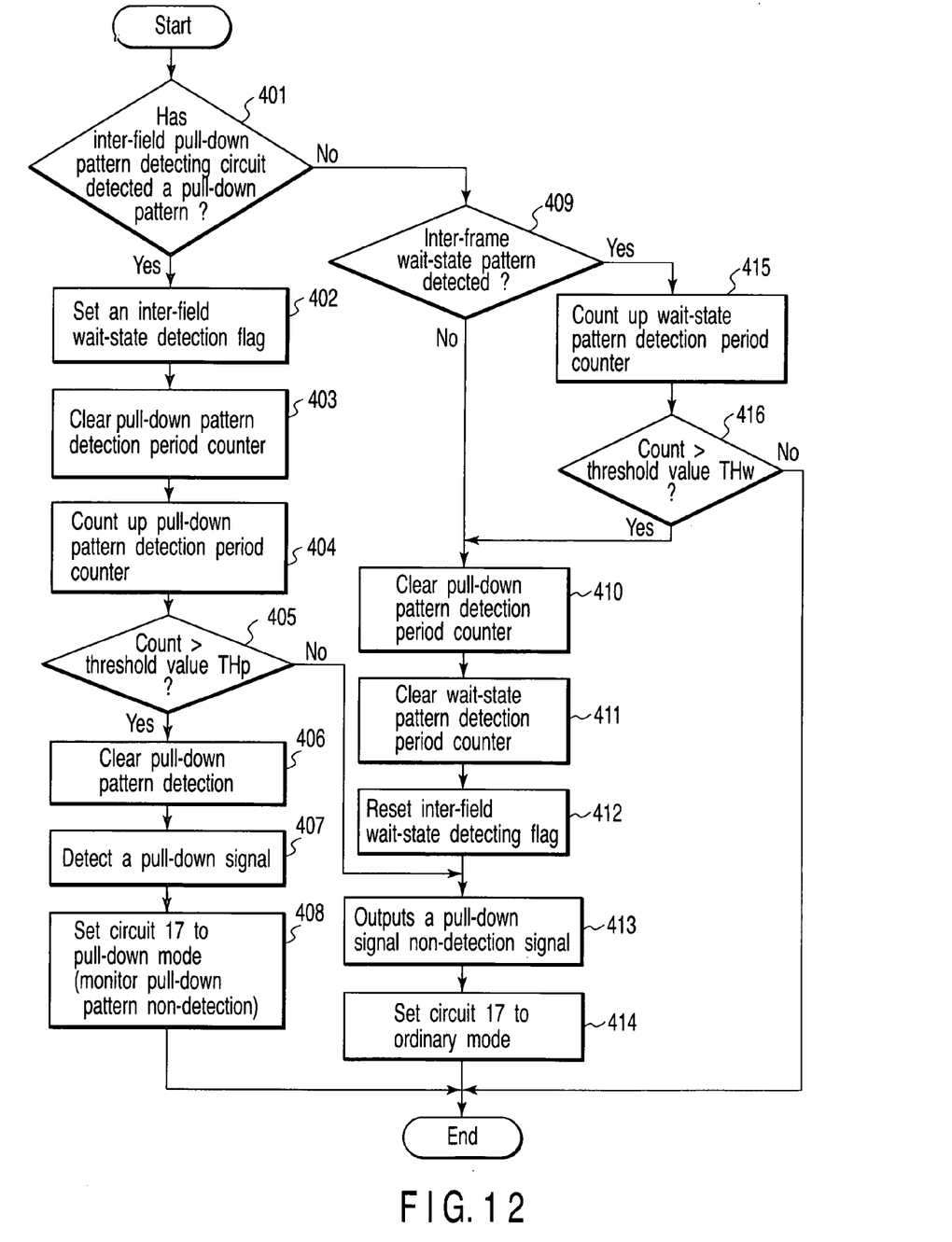
FIG. 12 is a flowchart explaining how the pull-down signal discriminating circuit 42 discriminates a pull-down signal by utilizing the output of the inter-frame pull-down pattern detecting circuit 41.

FIG. 9 is a flowchart explaining the operation of the inter-field pull-down pattern detecting circuit 36. FIG. 11 is a flowchart explaining the operation of an inter-frame pull-down pattern detecting circuit 41. The detecting circuits 36 and 41 operate almost in the same way. Therefore, only the operation of the inter-field pull-down pattern detecting circuit 36 will be explained in detail, with reference to FIG. 9. FIG. 10 is a flowchart that explains how a pull-down signal discriminating circuit 42 discriminates a pull-down signal by utilizing the output of the inter-field pull-down pattern detecting circuit 36. FIG. 12 is a flowchart explaining how the pull-down signal discriminating circuit 42 discriminates a pull-down signal by utilizing the output of the inter-frame pull-down pattern detecting circuit 41. The pull-down signal discriminating circuit 42 operates in the same way, whether it uses the output of the inter-field pull-down pattern detecting circuit 36 or the output of the inter-frame pull-down pattern detecting circuit 41. Therefore, the operation of the pull-down signal discriminating circuit 42 will be explained with reference to FIG. 10 only.

As described above, the pull-down signal discriminating circuit 42 determines that the input field signal is a pull-down signal, such as 2-3 pull-down signal or 2-2 pull-down signal, if the result of inter-field pull-down pattern detection and the result of inter-frame pull-down pattern detection satisfy the pull-down signal condition for a period of a predetermined number of fields. In this case, the pull-down signal discriminating circuit 42 outputs a pull-down signal detection signal.

First, how the pull-down signal discriminating circuit 42 operates will be explained with reference to the flowchart of FIG. 9. The process this flowchart shows is performed for each field.

Figures 3C, 3D:
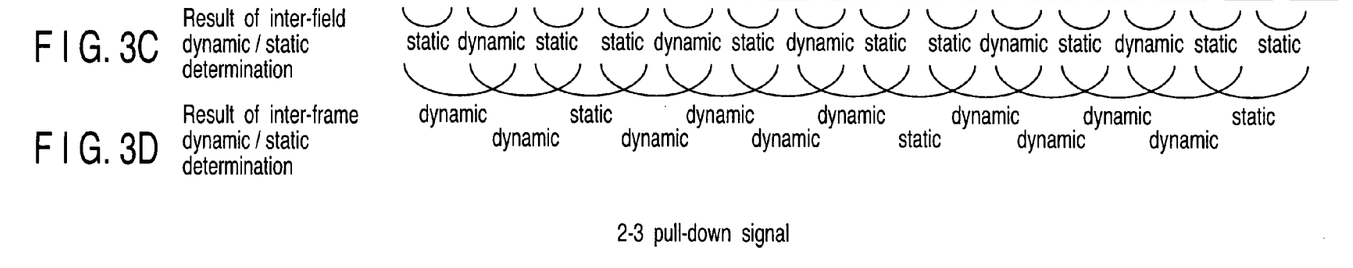
Figure 4C:
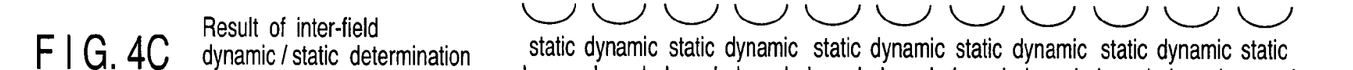
Figure 4D:
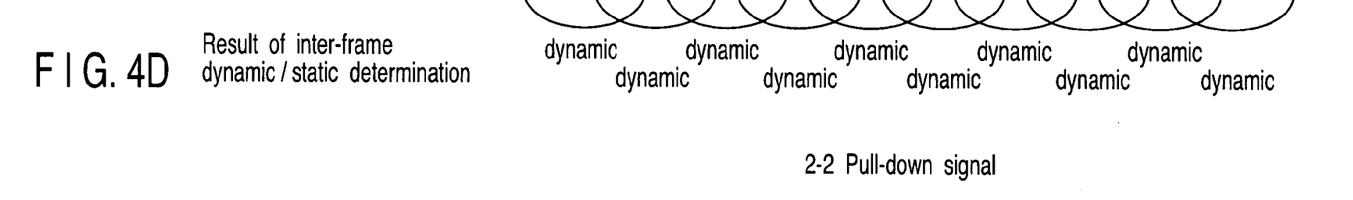

As shown in FIGS. 3C and 4C, the pattern detecting circuit 36 determines whether the result of inter-field dynamic/static determination, which has been supplied from the inter-field dynamic/static determination circuit 35, is perfectly identical to the pattern specific to the pull-down pattern with respect to a designated number of fields (5 in FIG. 3C; 2 in FIG. 4C) (Block 101). The pattern detecting circuit 36 outputs a pull-down pattern detection signal if the result of inter-field dynamic/static determination is identical to the pattern (Block 106).

If the result of inter-field dynamic/static determination is not identical to the pattern specific to the pull-down pattern (if NO in Block 101), the pattern detecting circuit 36 determines whether a wait-state detection flag (later described) is set (Block 102). If no wait-state detection flag is set (if NO in Block 102), the pattern detecting circuit 36 outputs a pull-down pattern non-detection signal (Block 104).

If a wait-state detection flag is set (if YES in Block 102), the pull-down pattern detecting circuit 36 determines whether the result of inter-field dynamic/static determination for the designated number of fields is perfectly identical to the wait-state pattern (Block 103). If the result of inter-field dynamic/static determination is perfectly identical to the wait-state pattern, the circuit 36 outputs a wait-state pattern detection signal (Block 105).

How the signal discriminating circuit 42 discriminate a pull-down signal by using the signal detected by the determines whether the inter-field pull-down pattern detecting circuit 36, with reference to the flowchart of FIG. 10. The process this flowchart shows is performed for each field.

The signal discriminating circuit 42 determines whether the pattern detecting circuit 36 has detected a pull-down pattern (Block 201). If the pattern detecting circuit 36 has detected a pull-down pattern, an inter-field wait-state detection flag is set (Block 202). Next, a wait-state pattern detection period counter 42c is cleared (Block 203), and a pull-down pattern detection period counter 42d is counted up (Block 204).

The signal discriminating circuit 42 determines whether the count of the pull-down pattern detection period counter 42d is larger than a threshold value THp (Block 205). If the count of the pull-down pattern detection period counter 42d is equal to or smaller than the threshold value THp (if NO in Block 205), the discriminating circuit 42 outputs a pull-down signal non-detection signal (Block 213).

If the pull-down pattern detection period counter 42d is larger than the threshold value THp (if YES in Block 205), the signal discriminating circuit 42 clears the pull-down pattern detection period counter 42d (Block 206). Then, the signal discriminating circuit 42 outputs a pull-down signal detection signal (Block 207). The pull-down signal detecting circuit 17 is thereby set to the pull-down mode (Block 208). Thus, the pull-down signal discriminating circuit 42 outputs a pull-down signal detection signal if it has detected more pull-down patterns than the number the threshold value THp represents. Pull-down signals can thereby be processed stably.

In the pull-down mode, the pull-down signal discriminating circuit 42 monitors only the pull-down pattern non-detection signal coming from the inter-field pattern detecting circuit 36. That is, in the pull-down mode, the signal discriminating circuit 42 does nothing at all even if a wait-state pattern detection signal is detected in Block 105 (FIG. 9) or even if a pull-down pattern detection signal is input in Block 106.

In the pull-down mode, such a wait-state pattern as shown in FIGS. 5C and 5D or 6C and 6D may be input to the pattern detecting circuit 36. In this case, the pattern detecting circuit 36 performs the process of Blocks 101, 102, 103 and 105 and outputs a wait-state pattern detection signal. Nonetheless, the pull-down signal discriminating circuit 42 remains in the pull-down mode. In the conventional apparatus, a pull-down non-detection signal is output as in Block 104 in such a case, and the pull-down signal discriminating circuit is released from the pull-down mode. Field signals S1, S2 and S3 are therefore processed as ordinary video signals. Consequently, the image displayed at the display unit is degraded in quality in the conventional apparatus. In the present embodiment, such degradation of image quality does not occur, because field signals S1, S2 and S3 are processed as pull-down signals if the inter-field dynamic/static determination results in a wait-state pattern.

The pattern detecting circuit 36 outputs a pull-down signal non-detection signal (Block 104) if an ordinary video signal (not such a 2-3 pull-down signal or such a 2-2 pull-down signal, as shown in FIGS. 3A to 6D) is input in the pull-down mode (if NO in Block 103).

In response to this pull-down pattern non-detection signal, the pull-down signal discriminating circuit 42 leaves the pull-down mode (finishes Block 208) and performs determination blocks in Blocks 201 and 209. Then, the pull-down pattern detection period counter 42d is cleared (Block 210), the wait-state pattern detection period counter 42c is cleared (Block 211), and the sate detection flag 42a is reset (Block 212). Further, a pull-down signal non-detection signal is output (Block 213). The pull-down signal detecting circuit 17 is thereby switched from the pull-down mode to the ordinary mode (Block 214). That is, the pull-down signal discriminating circuit 42 monitors the pull-down pattern detection signal, the pull-down pattern non-detecting signal and the wait-state pattern detection signal.

After some ordinary video signals are input (in the ordinary mode), consecutive pull-down pattern signals may be input again. In this condition, such a wait-sate pattern as shown in FIGS. 5C, 5D, 6D and 6D may be input while the count of the pull-down pattern detection period counter 42d remains equal to or smaller than the threshold value THp. In this case, the pattern detecting circuit 36 performs the process of Blocks 101, 102, 103 and 105, outputting a wait-state pattern detection signal. The pull-down signal detecting circuit 17 remains in the ordinary mode at this time. Therefore, the signal discriminating circuit 42 performs Blocks 201, 209 and 215 if the pattern detecting circuit 36 has output a wait-state pattern detection signal. The wait-state pattern detection period counter 42c is thereby counted up. Thus, the count of the pull-down pattern detection period counter 42d maintained unlike in the case where an ordinary video signal is detected.

After the wait-state pattern lasts for a period of several frames, the result of inter-field dynamic/static determination may change from a wait-state pattern back to an ordinary pull-down pattern. If this is the case, the pattern detecting circuit 36 outputs a pull-down pattern detection signal (Block 106). Since a pull-down pattern detection signal is output, the signal discriminating circuit 42 performs Blocks 201 to 203, counting up the pull-down pattern detection period counter 42d. More precisely, the signal discriminating circuit 42 starts counting, from the value available immediately before the wait-state pattern is detected. Thus, the count of the pull-down pattern detection period counter 42d is not reset even if a wait-state pattern is input and no ordinary pull-down patterns are detected. In the conventional apparatus, the pull-down pattern detection period counter 42d is reset every time a field signal having such a wait-pattern as shown in FIGS. 5C and 5D or 6C and 6D is input in a cycle shorter than the threshold value of the pull-down pattern detection period counter 42d. Consequently, it would take a long time to discriminate a pull-down signal. In the present embodiment, so long a time is never spent to discriminate a pull-down signal, because the pull-down pattern detection period counter 42d is not reset every time a field signal is input.

In the ordinary mode, the wait-state pattern may last for a certain period after a typical pull-down signal has been detected, and the count of the wait-state pattern detection period counter 42c may exceed the threshold value THw (YES in Block 216). In this case, the signal discriminating circuit 42 determines that the input signal is an ordinary video signal and clears the pull-down pattern period detection counter and the wait-state pattern period counter, both to "0" (Blocks 210, 211). The inter-field wait-state detection flag is reset (Block 212), and a pull-down signal non-detection signal is output (Block 213). Then, the pull-down signal discriminating circuit 42 is set to the ordinary mode (Block 214).

In the method described above, the pull-down pattern detection period counter 42d is never initialized even if a pull-down signal generated from a progressive signal (24 frames per second), from which some frames have been extracted, after an ordinary pull-down signal has been input. This suppresses the phenomenon that a considerably long time is required to detect a pull-down signal.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A pull-down signal detecting apparatus comprising:
a difference-calculating circuit which finds a difference between the present field signal of an input video signal and a signal delayed by one field with respect to the present field signal;
an inter-field correlation determination circuit which compares the difference output from the difference-calculating circuit, with a first comparison value, adds the result of the comparison for each field, compares the result of the addition with a second comparison value and determines an inter-field correlation level;
a first determination circuit which determines whether the input video signal is one of a first pull-down signal and a second pull-down signal for each field period, on pattern of consecutive inter-field correlation levels obtained by the inter-field correlation determination circuit;
a second determination circuit which comprises a first counter configured to count the number of times the first determination circuit determines that the input video signal is the first pull-down signal, and which determines that the input video signal is the first pull-down signal, when the count of the first counter exceeds a first preset value; and
a resetting unit which resets the count of the first counter to "0" when the first determination circuit determines that the input video signal is a signal other than the first and second pull-down signals, and which maintains the count of the first counter
when the first determination circuit determines that the input video signal is the second pull-down signal,
the first pull-down signal is a signal generated by converting a 24-frame-per second progressive-scan video signal representing an image composed of different frame images, to one of a 2-3 pull-down signal and a 2-2 pull-down signal, and the second pull-down signal is a signal generated by converting a 24-frame-per second progressive-scan video signal representing an image composed of frame images including consecutive identical images, to a 2-3 pull-down signal or a 2-2 pull-down signal.

2. The pull-down signal detecting apparatus according to claim 1, further comprising:
a first flag unit configured to set a flag when the first determination circuit determines that the input video signal is the first pull-down signal and to supply data representing the state of the flag, as the first flag information, to the first determination circuit,
wherein the first determination circuit determines that the input video signal is the second pull-down signal when the input video signal is not the first pull down signal and the first flag is set.

3. The pull-down signal detecting apparatus according to claim 2, further comprising a third determination circuit which comprises a second counter configured to count the number of times the first determination circuit determines that the input video signal is the second pull-down signal, and which determines that the input video signal is a signal other than the first and second pull-clown signal and resets the counts of the first and second counters to "0," when the count of the third counter exceeds a second preset value.

4. A video-signal converting apparatus comprising:
a field delaying circuit which provides a one-field-delayed signal generated by delaying the present field of an input video signal by one field, and a two-field-delayed signal generated by delaying the one-field-delayed signal by one field;
an interpolated signal generating circuit which generates a first interpolated signal from at least one of the present field signal, the one-field-delayed signal and the two-field-delayed signal;
a pull-down signal detecting circuit which detects a pull-down signal from the present field signal, the one-field-delayed signal and the two-field-delayed signal;
a first selector which selects one of the first and second interpolated signals on the basis of the result of detection performed by the pull-down signal detecting circuit and which provides the selected signal as a pair-field signal;
a second selector which selects one of the first interpolated signal and the pair-field signal on the basis of the result of detection performed by the pull-down signal detecting circuit and which provides the selected signal as a second interpolated signal; and
a conversion circuit which synthesizes the one-field-delayed signal and the second interpolated signal, thereby providing a progressive-scan signal,
the pull-down signal detecting circuit comprising:
a difference-calculating circuit which finds a difference between the present field signal and the one-field-delayed signal;
an inter-field correlation determination circuit which compares a first difference value output from the difference-calculating circuit, with a first comparison value, adds the result of the comparison for each field, compares the result of the addition with a second comparison value for each field and determines an inter-field correlation level;
a first determination circuit which determines whether the input video signal is one of a first pull-down signal and a second pull-down signal for each field period, on the basis of a pattern off consecutive inter-field correlation levels obtained by the inter-field correlation determination circuit;
a first flag unit which sets a flag when the first determination circuit determines that the input video signal is the first pull-down signal, and which supplies data representing the state of the flag, as the first flag information, to the first determination circuit;
a second determination circuit which comprises a first counter configured to count the number of times the first determination circuit determines that the input video signal is the first pull-down signal, and which determines that the input video signal is the first pull-down signal, when the count of the first counter exceeds a first preset value; and a resetting unit which resets the count of the first counter to "0" when the first determination circuit determines that the input video signal is a signal other than the first and second pull-down signals, and which maintains the count of the first count when the first determination circuit determines that the input video signal is the second pull-down signal, the first pull-down signal is a signal generated by converting a 24-frame-per second progressive-scan video signal representing an image composed of different frame images, to one of a 2-3 pull-down signal and a 2-2 pull-down signal, and the second pull-down signal is a signal generated by converting a 24-frame-per second progressive-scan video signal representing an image composed of frame images including consecutive identical images, to a 2-3 pull-down signal or a 2-2 pull-down signal.

5. The video-signal converting apparatus according to claim 4, further comprising:

a first flag unit configured to set a flag when the first determination circuit determines that the input video signal is the first pull-down signal and to supply data representing the state of the flag, as the first flag information, to the first determination circuit, wherein the first determination circuit determines that the input video signal is the second pull-down signal when the input video signal is not the first pull down signal and the first flag is set.

6. The video-signal converting apparatus according to claim 5, wherein the first pull-down signal is a signal generated by converting a 24-frame-per second progressive-scan video signal representing an image composed of different frame images, to one of a 2-3 pull-down signal and a 2-2 pull-down signal, and the second pull-down signal is a signal generated by converting a 24-frame-per second progressive-scan video signal representing an image composed of frame images including consecutive identical images, to one of a 2-3 pull-down signal and a 2-2 pull-down signal.

7. A pull-down signal detecting method comprising:

providing a difference between the present field signal of an input video signal and a signal delayed by one field with respect to the present field signal;

comparing the difference output from the difference-calculating circuit, with a first comparison value, adding the result of the comparison for each field, comparing the result of the addition with a second comparison value, determining an inter-field correlation level and providing the inter-field correlation level;

determining whether the input video signal is one of a first pull-down signal and a second pull-down signal for each field period, on the basis of a pattern of the consecutive inter-field correlation levels, and providing the result of the determination as a result of signal determination;

setting a flag when the input video signal is determined to be the first pull-down signal, and providing data representing the state of the flag, as the first flag information;

counting the number of times the input video signal is determined to be the first pull-down signal, and finally determining that the input video signal is the first pull-down signal, when the counted number of times exceeds a first preset value; and resetting the number of times counted to "0" when the input video signal is determined to be a signal other than the first and second pull-down signals, and maintaining the count of the first count when the first determination circuit determines that the input video signal is the second pull-down signal, wherein the first pull-down signal is a signal generated by converting a 24-frame-per second progressive-scan video signal representing an image composed of different frame images, to one of a 2-3 pull-down signal and a 2-2 pull-down signal, and the second pull-down signal is a signal generated by converting a 24-frame-per second progressive-scan video signal representing an image composed of frame images including consecutive identical images, to a 2-3 pull-down signal or a 2-2 pull-down signal.

* * * * *